(12) United States Patent
Bailey et al.

(10) Patent No.: US 7,650,360 B2
(45) Date of Patent: Jan. 19, 2010

(54) SYSTEM AND METHODS FOR DATABASE LOCK WITH REFERENCE COUNTING

(75) Inventors: Steven Bailey, Sammamish, WA (US); David J Nettleton, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 340 days.

(21) Appl. No.: 10/826,517

(22) Filed: Apr. 16, 2004

(65) Prior Publication Data

US 2005/0234989 A1   Oct. 20, 2005

(51) Int. Cl.
*G06F 17/00* (2006.01)

(52) U.S. Cl. .................. 707/104.1; 710/200

(58) Field of Classification Search ............ 707/1, 707/8, 9, 10, 101, 103 R, 104.1, 200, 201, 707/204, 205, 206, 100; 709/205, 219, 226, 709/229; 711/141; 717/177; 710/200
See application file for complete search history.

(56) References Cited

U.S. PATENT DOCUMENTS

| | | | |
|---|---|---|---|
| 5,317,739 A | 5/1994 | Elko et al. | |
| 5,408,653 A | 4/1995 | Josten et al. | |
| 5,414,839 A * | 5/1995 | Joshi ........................ 707/8 |
| 5,557,792 A | 9/1996 | Josten et al. | |
| 5,761,660 A | 6/1998 | Josten et al. | |
| 5,897,634 A | 4/1999 | Attaluri et al. | |
| 6,108,654 A * | 8/2000 | Chan et al. ................ 707/8 |
| 6,338,063 B1 * | 1/2002 | Barr .......................... 707/8 |
| 6,529,905 B1 * | 3/2003 | Corsberg et al. ............ 707/8 |
| 2003/0093652 A1 * | 5/2003 | Song ....................... 712/217 |

OTHER PUBLICATIONS

David et al., Lock-free reference counting, 2001, ACM, pp. 190-199.*
Ng et al., Concurrent Access to Point Data, 1997, IEEE, pp. 368-373.*
L.D. Molesky and K. Ramamritham. Database Locking Protocols for Large-scale Cache-coherent Shared Memory Multiprocessors: Design, Implementation, and Performance. 12th International Conference on Data Engineering, 1995. 24 pages.
Tatu Ylonen. Shadow Paging is Feasible. Department of Computer Science, Helsinki University of Technology, 1995. 16 pages.

* cited by examiner

*Primary Examiner*—Fred I Ehichioya
(74) *Attorney, Agent, or Firm*—Workman Nydegger (57) ABSTRACT

Systems and methodologies are provided in a lock hierarchy arrangement wherein upon release of all child locks associated with a parent lock, then such parent lock is also released. The present invention supplies each lock with sufficient information to determine its own life time. Such framework enables a higher degree of transaction concurrency in a database, and mitigates an over locking thereof, thus conserving system resources.

24 Claims, 9 Drawing Sheets

SYSTEM AND METHODS FOR DATABASE LOCK WITH REFERENCE COUNTING

TECHNICAL FIELD

The present invention relates generally to locking mechanism in databases, and more particularly to systems and methods that facilitate locking of resources during performance of concurrent transactions by employing a reference count in parent-child lock configurations.

BACKGROUND OF THE INVENTION

Increasing advances in computer technology (e.g., microprocessor speed, memory capacity, data transfer bandwidth, software functionality, and the like) have generally contributed to increased computer application in various industries. Ever more powerful server systems, which are often configured as an array of servers, are often provided to service requests originating from external sources such as the World Wide Web, for example. As local Intranet systems have become more sophisticated thereby requiring servicing of larger network loads and related applications, internal system demands have grown accordingly as well. As such, much business data is stored in databases, under the management of a database management system (DBMS).

Typically, such databases can be viewed as organized collection of related information stored as "records" having "fields" of information therein. As an example, a database of finances may have a record for financial transactions such as accounts receivables, amount owed, customer information and the like. Between the actual physical database itself (i.e., the data actually stored on a storage device) and the users of the system, the database management system or DBMS is typically provided as a software cushion or layer. As such, the DBMS can shield users of the database from concerns about the underlying hardware-level details. Generally, all requests from users for access to the data are processed by the DBMS. For example, information can be added or removed from data files, information retrieved from or updated in such files, and the like, all without user knowledge of underlying system implementation. Thus, the DBMS provides users with a conceptual view of the database that is removed from the hardware level itself.

While interacting with such computer systems, many applications employ a function referred to as locking to ensure that data the applications are modifying is not modified by another application or process. Typically, such locking of the data can prevent users from changing the same data at the same time. If such locking mechanisms do not operate properly, data can become logically incorrect, and future use of the data can produce unexpected results. In addition, multiple transactions trying to use the same data concurrently can give rise to several different types of problems referred to as concurrency problems.

Such problems can cause updates of data by one application to be lost or overwritten by another application. Sometimes data is modified, but not immediately written out in a manner that it can be read by other applications. This can also result in reads of data which should be the same, not being the same. Further problems can result from applications using copies of data, which are then changed by a later application. While there are several different types of locks, such as exclusive locks, shared locks, update locks and other types of locks, many of them provide some amount of concurrency to ensure that two applications do not modify data at the same time, or use data which may or may not be accurate. Such types of locks can consume system resources and have associated costs. Fine grain locks, which lock on a small amount of data, such as on a row of a database, each have memory resources and processing resources associated with storing and managing them. If many rows are involved in a transaction which needs to lock portions of the database to ensure concurrency, a significant amount of system resources can be consumed. The problems associated with the lock control can include a trade off between the transaction concurrence based on the granularity of the locked data unit and the overhead in the lock control processing.

Moreover, for such systems over-locking can create problems, wherein a transaction acquires more locks than is necessary and/or holds locks for longer than is required. Typically, while such over-locking will not necessarily result in transaction isolation being violated, it can lead to a reduction in the concurrency that the system can support. Put differently, resources can be locked that need not be locked, thus becoming unavailable to other transactions.

At the same time, minimizing the locks that are retained during a transaction's operation can pose problems when a lock hierarchy is involved. For example, placing an X lock on a row will typically result in IX locks being placed on all parent objects of the row, e.g., page, table and database.

In such cases, even if the row lock is simply discarded prior to the completion of the transaction, discarding associated parent resources or locks can be a challenging task. Furthermore, even if such associated parent locks are identified and removed, they still may need to be reacquired immediately for subsequent operations, hence creating an inefficient procedure Therefore, there is a need to overcome the aforementioned deficiencies associated with conventional systems and methodologies related to database operations.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the present invention. Rather, the sole purpose of this summary is to present some concepts of the invention in a simplified form as a prelude to the more detailed description that is presented hereinafter.

The present invention provides for systems and methods of supplying a database with a parent-child lock hierarchy arrangement, such that each lock contains sufficient information to determine its own life time. Such information can be supplied via a reference count of the locks, wherein upon release of all child locks associated with a parent lock, the parent lock can also subsequently be released. This framework enables a higher degree of transaction concurrency in a database, and mitigates an over locking thereof, thus conserving system resources. Accordingly, the database performance can be increased while improving an end-user experience.

In accordance with an aspect of the present invention, a multi-level hierarchy tree can be constructed with a plurality of parent locks, each of which is associated with one or more child locks. Such an arrangement can include a lock manager that acquires locks (e.g., intent locks, exclusive locks and the like) on various resources starting from a high hierarchy level, and moving down the hierarchy based on database transactions to be performed. The lock granularity of the hierarchy can be based on logical or physical granularities of objects or their sub combinations stored in the data base.

Such lock manger can also execute a reference count of the locks at predetermined intervals (e.g., after completion of an operation or query, or at other predetermined times). In addition, the parent lock can be designated to cover the child operation, with such parent lock being removed once all child locks associated therewith are removed.

In a related aspect of the present invention the lock manager guards a logical consistency of the database during performance of concurrent transactions performed thereon, wherein as the child locks are removed, then the parent (e.g., an intent lock) of such child locks can also be removed. For example, as a transaction scans data it can acquire locks for certain resources. When such scanning is completed, a methodology according to the present invention can remove not only child locks at a low level, but also the higher parent level locks structures. As child locks are requested at a lower level of the hierarchy, parent locks can be obtained at a high level of the hierarchy, and as the child locks are removed, the parent child can be removed thereafter.

A further aspect of the present invention provides for a lock monitoring and reference system, wherein as each lock is being released, a number of locks referenced by an associated parent lock of the released lock can be decremented by one. Accordingly, once the number of locks associated with the parent lock reaches zero, the parent lock can then be removed. In an exemplary aspect, a pointer can guide the release operation from each child lock to its respective parent. Such enables an efficient operation for releasing locks that are no longer required.

The lock manager of the present invention can further allow sub page level locks across concurrent transactions. Such lock manager can be visible to all transactions, and based on a normal concurrency of operation a determination can be made whether a lock on a particular resource (e.g., a row level locking) can be granted. As such, the lock manager can facilitate compatibility of operations across concurrent transactions, and effectively administer logical considerations during modifications of the database.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

Figure 1:
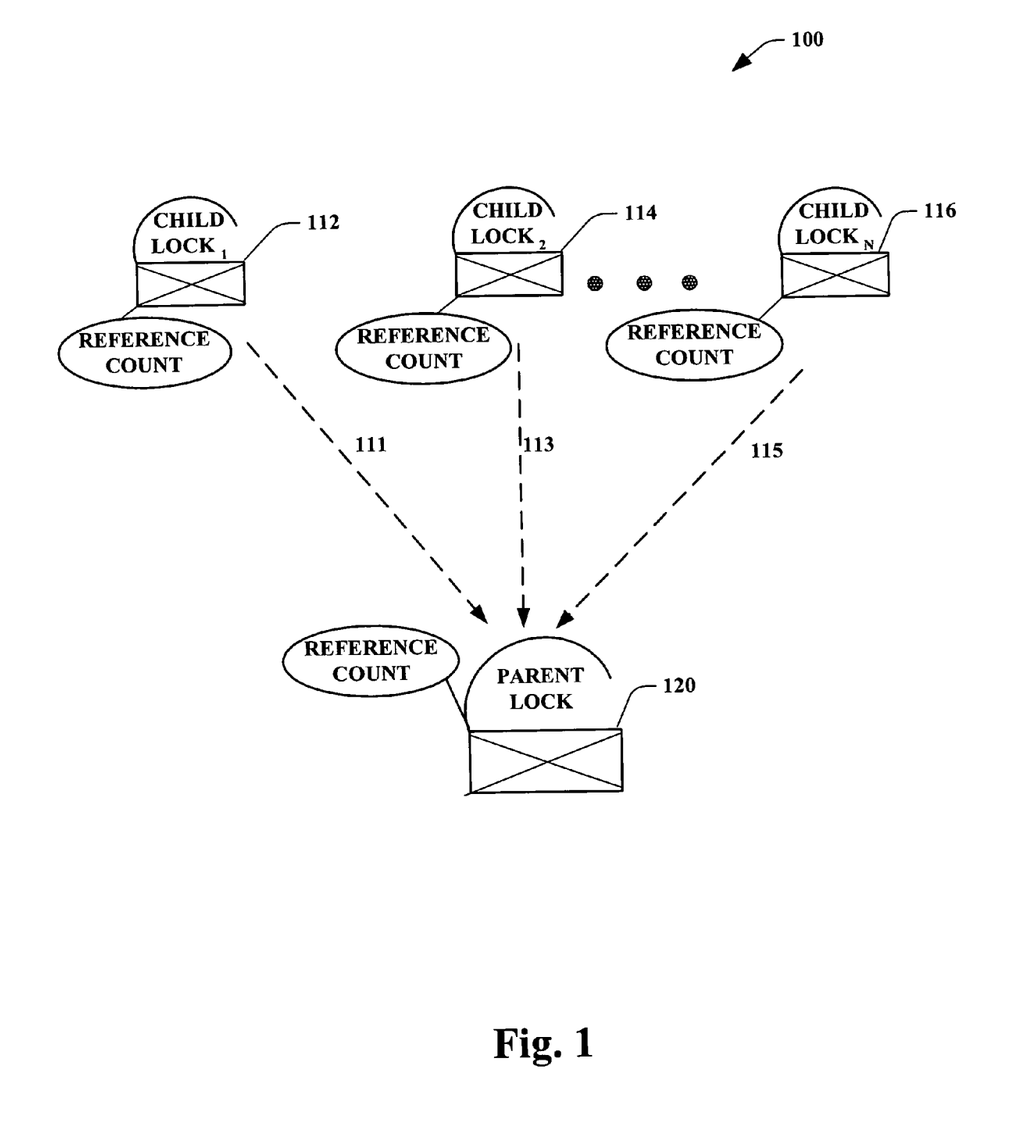
FIG. 1 illustrates a particular child-parent direct lock arrangement with reference count at a single hierarchy level according to one aspect of the present invention.

The present invention provides for systems and methods of supplying a database with parent-child lock hierarchy arrangement, such that each lock contains sufficient information to determine its own life time. Referring initially to FIG. 1, a particular parent-child configuration is illustrated at a single and direct hierarchy level 100. Typically, locking of data via any of the parent or child locks can mean that during a transaction, the locked data may not be available for use by other queries, making them wait for execution until the data is unlocked. Exact determination of such procedure can be controlled by the lock manager that enforces the compatibility of the locks supported.) Each of the child locks 1 thru N (N being an integer) can have a parent lock 120, with each of locks 112, 114, and 116 having a reference count component associated therewith. Such reference count component can contain a number of the direct children that the lock is associated with. For example the parent lock 120 can be associated with N locks (N being an integer). It is to be appreciated that other reference counting algorithms can also be employed, besides counting the direct number of child locks. As illustrated, once the entire child locks 112, 114 and 116 are released, then the parent lock 120 associated with such child locks can also be released. In addition, pointer components 111, 113, 115 can provide guides to the parent lock 120, when their associated child locks are released.

It is to be appreciated that FIG. 1 simply illustrates a parent-child relation at a single hierarchy level, and multiple layers can be available, with a child lock for one level, acting as a parent lock for other locks located at a lower level of the hierarchy. As such, the reference count lock of the present invention allows for a decision to free a lock based on the data stored in the lock itself. In addition, the reference counting of a lock can be scoped per transaction, wherein each transaction typically only needs to reference count locks associated with that transaction, and not other transactions acting concurrently on the database. Such an arrangement enhances concurrency of transactions by mitigating unnecessary blocking of the data in a database.

Figure 2:
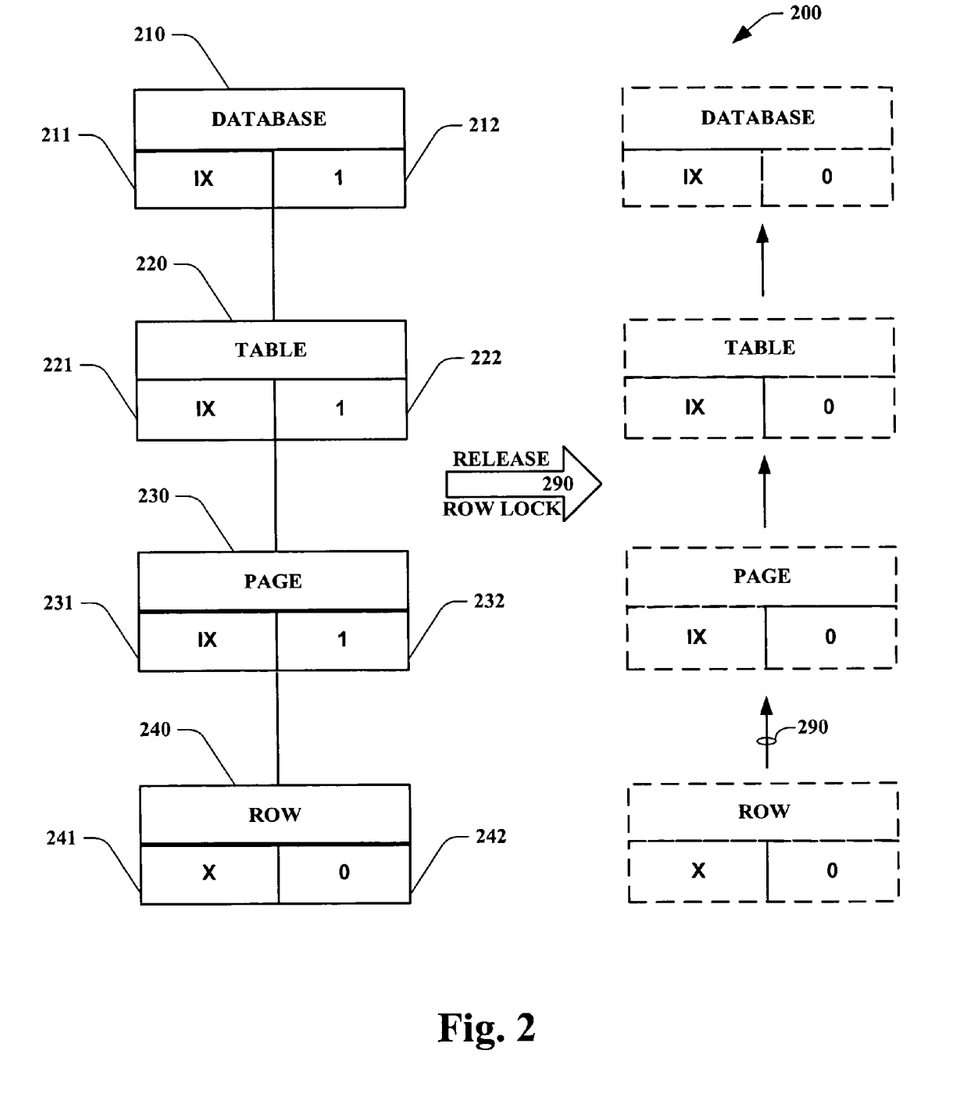
FIG. 2 illustrates an exemplary reference counted lock hierarchy in accordance with another aspect of the present invention.

FIG. 2 illustrates an exemplary reference counted lock hierarchy in accordance with a particular aspect of the present invention. As illustrated, a lock hierarchy 200 handles a concurrency control, wherein when one user has a lock on a subset of the database the data is blocked or protected from other users' attempts to make changes to it (e.g., whether there is logical permission to insert a row at a particular location)—One user's changes have to be "committed" before another user can see or further change the same data. The lock hierarchy 200 is based on row, page and table, and database granularities. It is to be appreciated that such an arrangement illustrates an exemplary hierarchy, and that other hierarchies based on other logical and/or physical granularities can be evident to one skilled in the art. Such arrangement 200 can be part of an SQL server arrangement that provides access to a database 210 comprising of tables 220 with data pages 230 with data rows 240 therein. Typically, data can be stored in memory on pages, which are predetermined numbers of bytes, such as four thousand in one server. The row level 240 is a single row that is locked exclusively (X) 241 for a modification thereof by a transaction. Such modifications can include change of data at a particular slot, insertions of rows, deletion of rows and the like. Acquiring an exclusive X lock 241 at the row level 240 can typically require an initial grant of intent locks on the upper level resources of the lock hierarchy 200. For example, and as illustrated, an intent lock 231 should be acquired at the page level 230 that contains the row 240 therein. Moreover, an intent IX lock 221 should also be granted at a table level 220. Similarly, an intent lock IX 211 should also be acquired at the database level 210. Typically, locks can be acquired from a top of the hierarchy downwards to maintain an efficient process. Each of the locks at the various levels can also contain a reference count of the number of child locks that directly exist at the lower level of that lock. For example, as there are no locks directly beneath the level 240, a reference count of zero at 242 is indicated, and also reference counts can typically be stored for locks that can be parents of other locks, and since a row lock cannot be a parent lock of other locks no reference count is required for them. In general, a reference count may not be needed for a lock that does not function as a parent lock, and thus has no child lock(s) associated therewith. Likewise, at the page level 230 a reference count of one at 232 is indicated because a single row level lock 240 is beneath such page level. Moving up the hierarchy level to the table lock 220, again a reference count of one lock is indicated at 222, which is a count of the number of locks directly associated with the table lock 220. Put differently, even though two locks are accumulated beneath the table lock 220 (namely the page lock 230 and the row lock 240), only the page lock 230 is directly associated with the table lock 220, and hence is counted in the reference count at 222. Similarly, at the database level 210, the reference count of the associated locks is one lock as indicated at 212. It is to be appreciated that other counting algorithms can also be employed, and are considered within the realm of the present invention. Such reference count can provide a lock with information to determine its own lifetime, and facilitate lock management, as any lock can be released upon its associated child locks being released, and its reference count reaching a value of zero.

For example, when the exclusive row lock 240 is released as illustrated by the arrow 290 then a chain reaction for releasing the intent locks 230, 220 and 210 initiates. After the exclusive row lock 240 is released, the pointer 290 can guide the release operation from the child lock to its respective parent, so that the count reference associated with page level 230 reaches a value of zero, as shown by the dashed box. As such, the page level can be efficiently released. Such release of the page level lowers a count of reference locks associated with the page level 230 to a value of zero. Accordingly, the count of reference locks at the table level also reaches a value of zero. Such chain continues up to the database, wherein the database lock is also released when its count reference value reaches a value of zero. This enables an efficient operation for releasing locks that are no longer required, wherein each lock contains sufficient information to determine its own life time.

Figure 3:
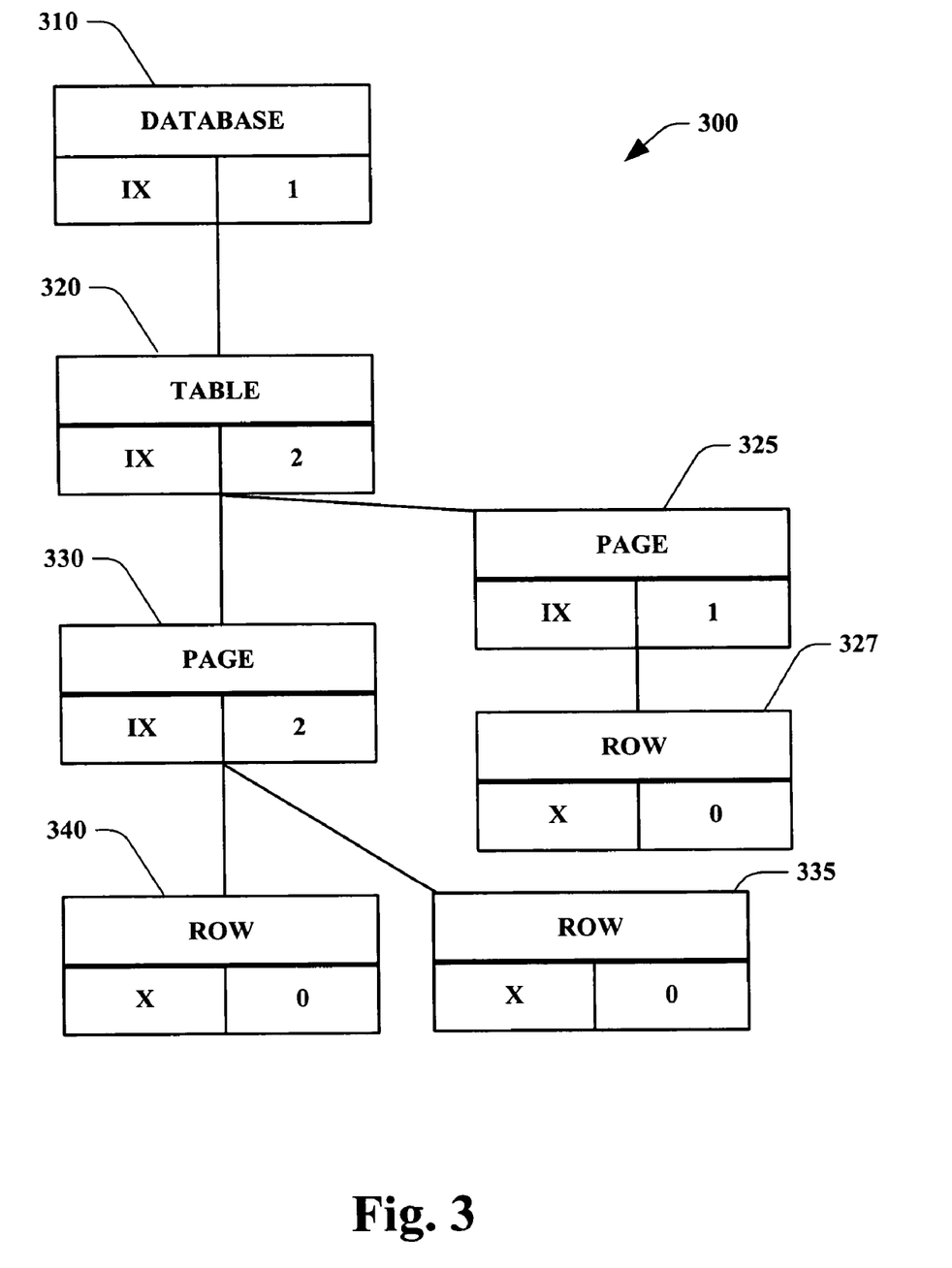
FIG. 3 illustrates another exemplary lock hierarchy with reference count in accordance with another aspect of the present invention.

Referring now to FIG. 3, another exemplary reference count lock hierarchy in accordance with a particular aspect of the present invention is illustrated. Such lock control hierarchy 300 can be in a relational database system, wherein the database consists of a group of tables each of which consists of a group of data pages. Thus, a hierarchy can be constructed in the order (database>table>data page) with acquired intent locks IX at the various levels of database 310, table 320, page 325, and page 330. Also, exclusive row locks have been acquired at 327, 335, and 340. For example, as a page of data 325, or 330 is scanned each of its rows can be locked and examined to ascertain if such row matches an updated criteria. Should the row match the updated criteria, the lock on the row and the parent lock(s) on the row can be retained. Alternatively, if the row does not match the criteria then the row lock can be released. Accordingly, once the page scan is complete, and whenever a parent lock (e.g., an intent lock) has no longer any child locks associated therewith, then the parent lock can also be released. In a related aspect, an optimization procedure can be implemented, wherein as a page scan occurs, a last child lock can be held on to until a next one is acquired. This increases efficiency as a reference count of the parent page lock does not reach a value of zero, until the page scan is complete and page no longer is required. Otherwise, a reference count of the page lock can reach zero, (e.g., the page intent lock will be released), thus releasing higher hierarchy locks, when in fact such hierarchy locks are to be reacquired when another row on same page is locked. Accordingly, a lock can contain sufficient information to determine its life time.

As explained in more detail supra and as illustrated, the reference counts at rows 340, 335 and 327 are zero, since reference counts can be stored for locks that can be parents of other locks,—(a row lock typically cannot be a parent lock of other locks). The page level intent and parent lock 330 has a reference count of two, because the row level child locks 340 and 335 are directly beneath such parent and intent lock. Similarly, the page level 325 has a reference count of one, as there is only one row 327 beneath such page level. Moving up the hierarchy level to the table lock 320, a reference count of two locks are indicated, which refers to the page lock 330 and 325. Similarly, the database lock 310 indicates a reference count of one, as such data base lock can act as the parent lock associated with table 320. Accordingly, any intent lock can include information on its own lifetime, and be released upon its reference count reaching a value of zero.

Figure 4:
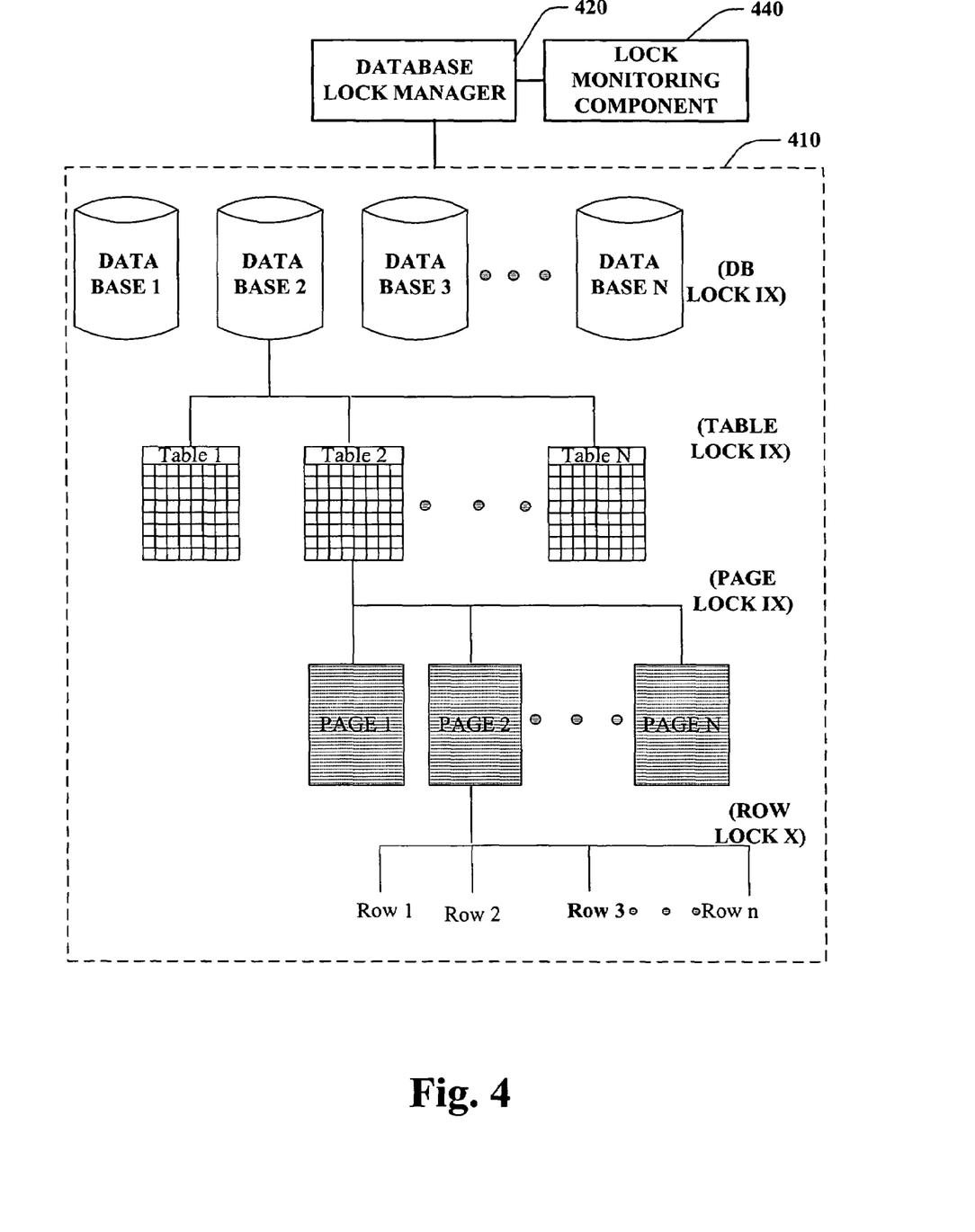
FIG. 4 illustrates an exemplary lock hierarchy administered by the lock manager in accordance with an aspect of the present invention.

Referring now to FIG. 4 a lock hierarchy 410 is illustrated that is administered by a lock manger 420, having a monitoring component 440 to monitor a reference count of child locks associated with a parent lock, wherein as each child lock is being released, a number of locks referenced by an associated parent lock of the released lock can be decremented by one. Accordingly, a parent lock can be released when a reference count of its associated child locks reach a value of zero. In addition, such arrangement can determine whether a lock on a particular resource can be granted, and is typically well suited to administer sub-page locking (e.g., row level locking). It is to be appreciated that given such a granularity relationship in release (or grant) of various intent locks and exclusive locks, various rules can also be developed and enforced to ensure that removal of locks are performed efficiently (e.g., when a lock is removable at one stage, yet re-acquisition of such lock is desired at another stage of the operation.)

Figure 5:
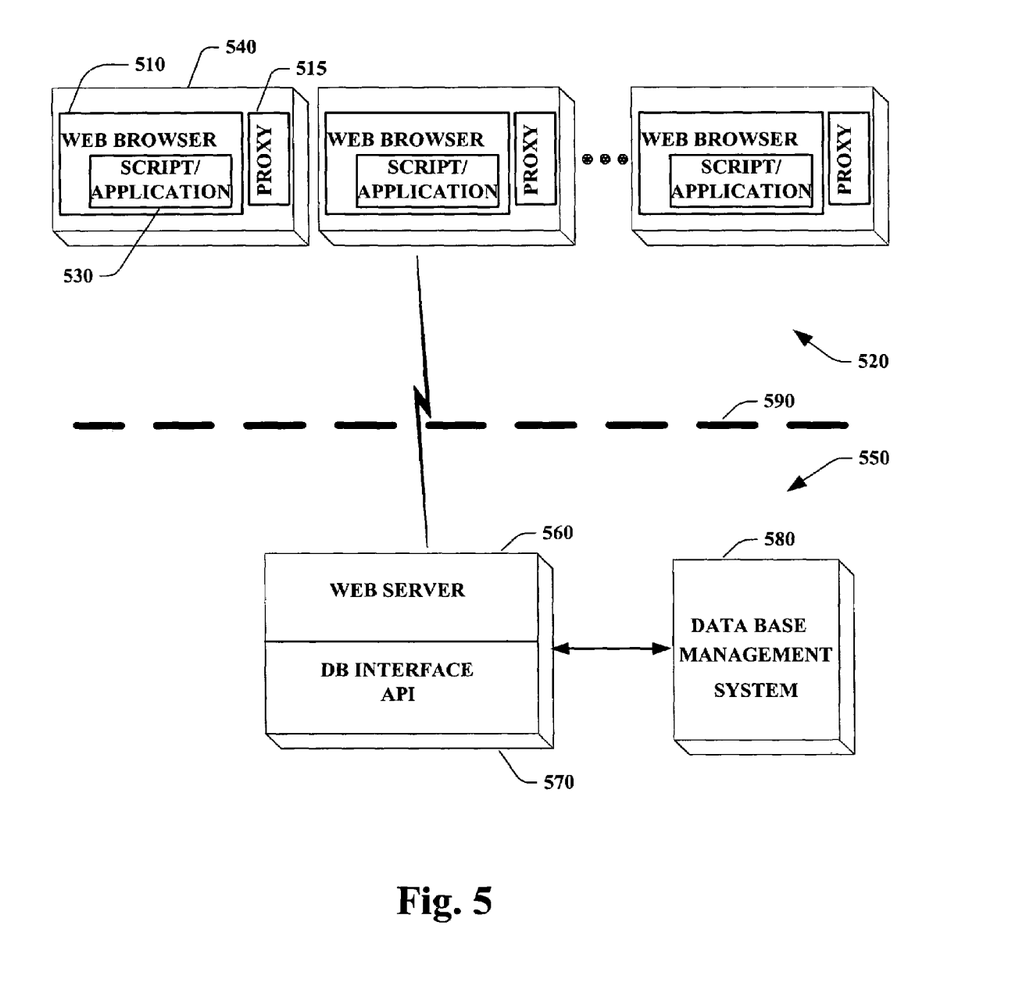
FIG. 5 illustrates a plurality of clients that can acquire a lock hierarchy to a data base in accordance with an aspect of the present invention.

FIG. 5 illustrates a plurality of clients that can acquire a lock hierarchy on a data base in accordance with an aspect of the present invention. Based on a normal concurrency of operations, a lock manager (not shown) can grant or deny a lock to a particular resource. For example, the lock manager can grant an exclusive lock for a particular row to a transaction from any of such clients, and other transactions would then be restricted to modify such row, even though modifications to other rows can still be permitted. Running on each of the client 520 can be a client process, for example, a web browser 510 and running on the server 550 can be a corresponding server process, for example, a web server 560. In addition, embedded in the Web Browser 510 can be a script or application 530, and running within the run-time environment 540 of the client computer 520, can exist a proxy 515 for packaging and unpacking data packets formatted. Communicating with the server 550 is a database management system (DBMS) 580, which manages access to a database (not shown). The DBMS 580 and the database (not shown) can be located in the server itself, or can be located remotely on a remote database server (not shown). Running on the Web server 560 is a database interface Applications Programming Interface (API) 570, which provides access to the DBMS 580. The client computer 520 and the server computer 550 can communicate with each other through a network 590. When the client process, e.g., the Web browser 510, requests data from a database, the script or application 530 issues a query, which is sent across the network (e.g. internet) 590 to the server computer 550, where it is interpreted by the server process, e.g., the Web server 560. The client's 520 request to server 550 can contain multiple commands, and a response from server 550 can return a plurality of result sets.

In such communication, session, presentation, and application service elements can be provided by Tabular Data Stream (TDS). Since TDS does not require any specific transport provider, it can be implemented over multiple transport protocols and the network 590. Responses to client commands that are returned can be self-describing, and record oriented; (e.g., the data streams can describe names, types and optional descriptions of rows being returned.)

On the client side 520 the data can be a Structured Query Language (SQL) command being in a language that the server side 550 can accept, a SQL command followed by its associated binary data (e.g., the data for a bulk copy command), or an attention signal. When a connection is desired, the client 520 can send a connection signal to the server. Even though the client 520 can have more than one connection to the server 550, each connection path can be established separately and in the same manner.

Once the server 550 has received the connection signal from the client 520 can notify the client that it has either accepted or rejected the connection request. Likewise to send SQL command or batch of SQL commands; then the SQL command (e.g., represented by a Unicode format) can be copied into the data section of a buffer and then sent to the SQL server side 550. In addition, various Open Data Base Connectivity (ODBC) routines can cause SQL command to be placed into a client message buffer, or can cause the message buffer to be sent to the server.

Figure 6:
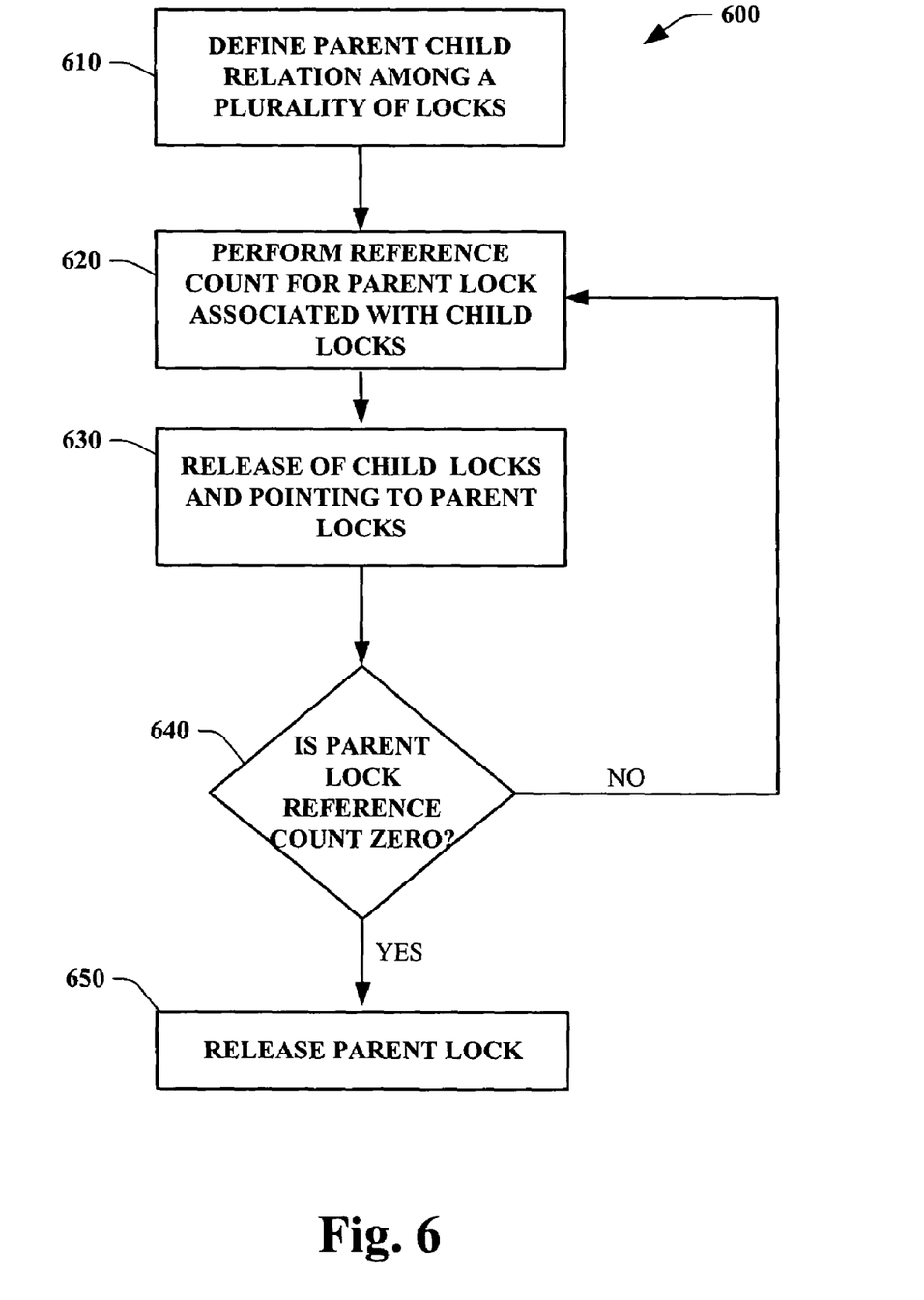
FIG. 6 illustrates a methodology for releasing parent locks in accordance with an aspect of the present invention.

FIG. 6 illustrates a methodology 600 according to one aspect of the present invention, wherein a parent-child relation is initially defined at 610 among various levels of a lock hierarchy. Such lock hierarchy can include an exclusive row lock and a series of intent locks. Typically, when a transaction performs an exclusive lock on a certain record, (e.g., a row-level lock), it also performs an intention lock(s) on the hierarchy ranking superior to that record. Typically, to increase efficiency and avoid dead locks, lock acquisition can initiate from a top of the hierarchy and percolate downward. Subsequently, for each parent lock a reference count can be performed at 620 wherein a number of the direct children that the lock is associated with are counted. During a release operation of child locks at 630 (e.g., if a row does not match the criteria and release of a row-lock) a pointer can guide the operation to its associated parent lock, and identify it. Subsequently, at 640 a determination is made as to whether a reference count associated with the parent lock has reached a value of zero. If such reference count is zero then the parent lock can be efficiently released. Otherwise, the operation can be repeated, and a reference count calculated upon a next round of releasing child locks associated with a parent lock. It is to be appreciated that the reference counting of a lock can be scoped per transaction, wherein each transaction typically only needs to reference count locks associated with that transaction, and not other transactions acting concurrently on the database.

Figure 7:
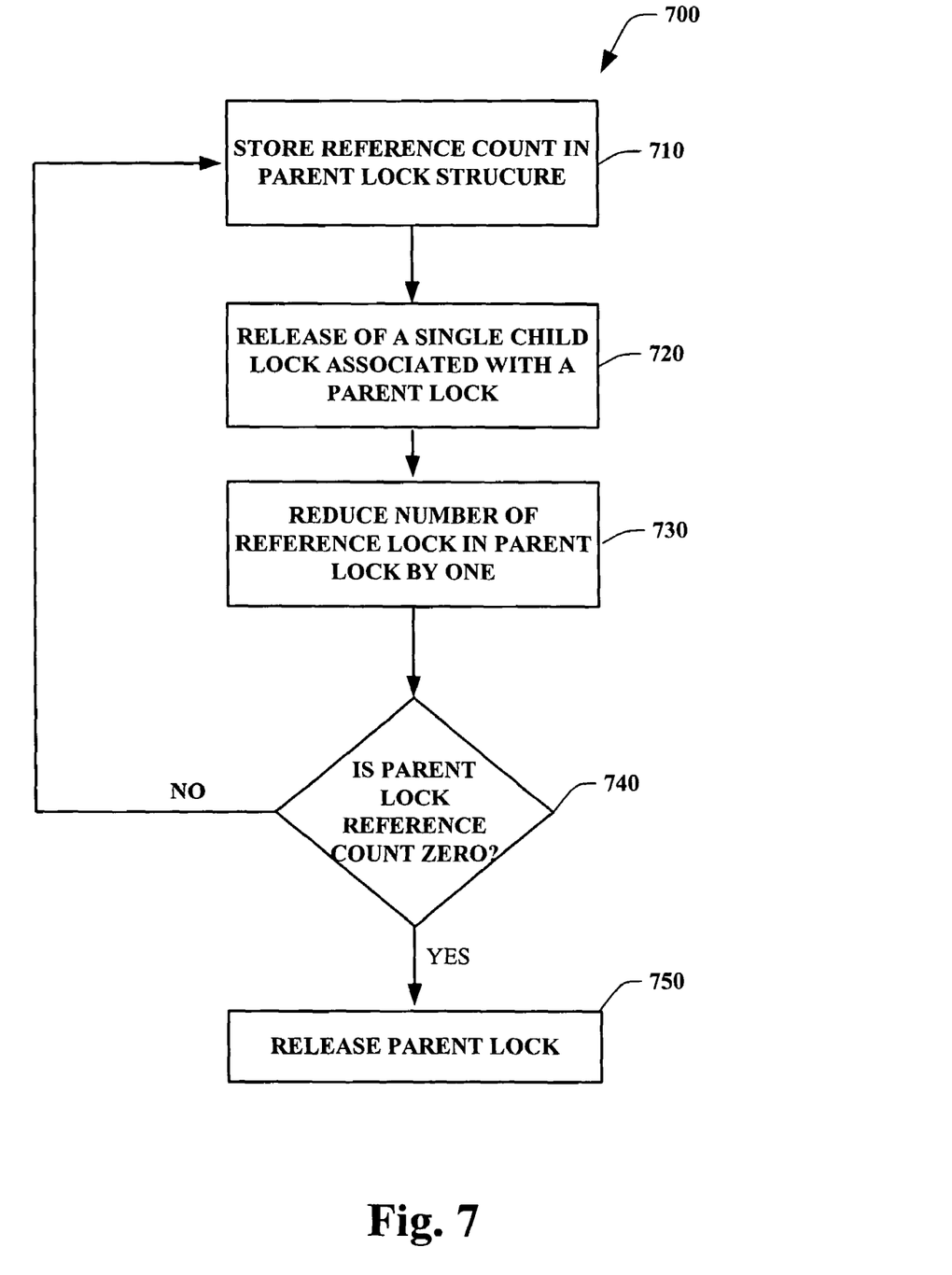
FIG. 7 depicts another methodology for a reference count according to a particular aspect of the present invention.

FIG. 7 illustrates a related methodology 700 according to a further aspect of the present invention, wherein a reference count is saved within a structure of the parent lock itself at 710. Such reference count lock allows for a decision to free a lock based on the data stored in the lock itself. Next, and upon release of a single child lock associated with the parent lock at 720, the number of reference count lock is reduced by one at 730. Should such reduction cause the value of reference count in the parent lock to become zero at 740, the parent lock can be released at 750. Otherwise, the methodology stores a new count for the parent lock therein. Such chain reaction can initiate from the low hierarchy level and continue up to the top levels.

Figure 8:
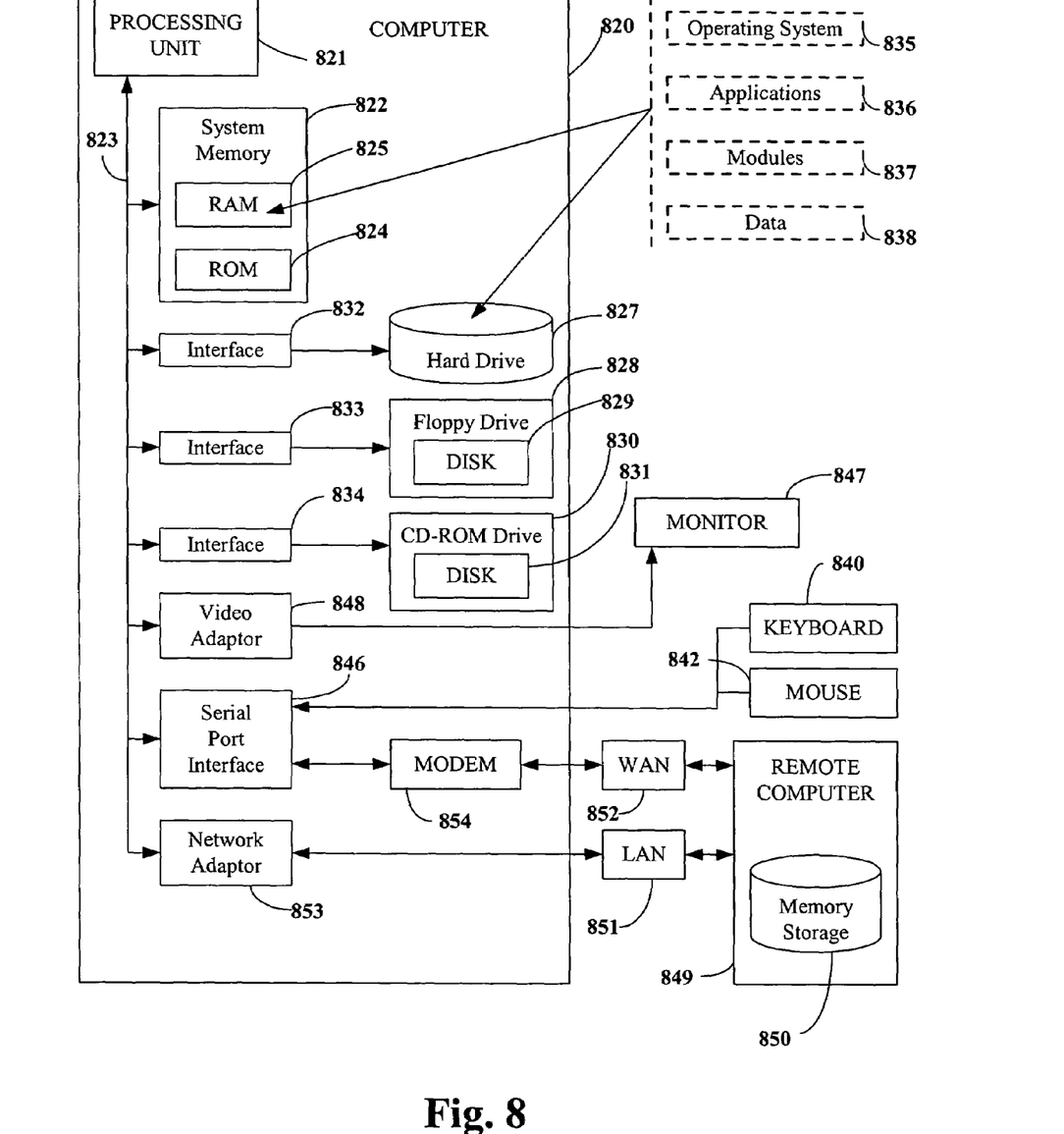
FIG. 8 is a schematic block diagram illustrating a suitable computing environment that can employ various aspects of the present invention.

Referring now to FIG. 8, a brief, general description of a suitable computing environment on the client as well as the server side is illustrated wherein the various aspects of the present invention can be implemented. While the invention has been described above in the general context of computer-executable instructions of a computer program that runs on a computer and/or computers, those skilled in the art will recognize that the invention can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices. The exemplary includes a computer 820, including a processing unit 821, a system memory 822, and a system bus 823 that couples various system components including the system memory to the processing unit 821. The processing unit 821 may be any of various commercially available processors. Dual microprocessors and other multi-processor architectures also can be used as the processing unit 821.

The system bus may be any of several types of bus structure including a memory bus or memory controller, a peripheral bus, and a local bus using any of a variety of commercially available bus architectures. The system memory may include read only memory (ROM) 824 and random access memory (RAM) 825. A basic input/output system (BIOS), containing the basic routines that help to transfer information between elements within the computer 820, such as during start-up, is stored in ROM 824.

The computer 820 further includes a hard disk drive 827, a magnetic disk drive 828, e.g., to read from or write to a removable disk 829, and an optical disk drive 830, e.g., for reading from or writing to a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the present invention.

A number of program modules can be stored in the drives and RAM 825, including an operating system 835, one or more application programs 836, other program modules 837, and program data 838. The operating system 835 in the illustrated computer can be substantially any commercially available operating system.

A user can enter commands and information into the computer 820 through a keyboard 840 and a pointing device, such as a mouse 842. Other input devices (not shown) can include a microphone, a joystick, a game pad, a satellite dish, a scanner, or the like. These and other input devices are often connected to the processing unit 821 through a serial port interface 846 that is coupled to the system bus, but may be connected by other interfaces, such as a parallel port, a game port or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The computer 820 can operate in a networked environment using logical connections to one or more remote computers, such as a remote computer 849. The remote computer 849 may be a workstation, a server computer, a router, a peer device or other common network node, and typically includes many or all of the elements described relative to the computer 820, although only a memory storage device 850 is illustrated in FIG. 8. The logical connections depicted in FIG. 8 may include a local area network (LAN) 851 and a wide area network (WAN) 852. Such networking environments are commonplace in offices, enterprise-wide computer networks, Intranets and the Internet.

When employed in a LAN networking environment, the computer 820 can be connected to the local network 851 through a network interface or adapter 853. When utilized in a WAN networking environment, the computer 820 generally can include a modem 854, and/or is connected to a communications server on the LAN, and/or has other means for establishing communications over the wide area network 852, such as the Internet. The modem 854, which can be internal or external, can be connected to the system bus 823 via the serial port interface 846. In a networked environment, program modules depicted relative to the computer 820, or portions thereof, can be stored in the remote memory storage device. It will be appreciated that the network connections shown are exemplary and other means of establishing a communications link between the computers can be employed.

In accordance with the practices of persons skilled in the art of computer programming, the present invention has been described with reference to acts and symbolic representations of operations that are performed by a computer, such as the computer 820, unless otherwise indicated. Such acts and operations are sometimes referred to as being computer-executed. It will be appreciated that the acts and symbolically represented operations include the manipulation by the processing unit 821 of electrical signals representing data bits which causes a resulting transformation or reduction of the electrical signal representation, and the maintenance of data bits at memory locations in the memory system (including the system memory 822, hard drive 827, floppy disks 829, and CD-ROM 831) to thereby reconfigure or otherwise alter the computer system's operation, as well as other processing of signals. The memory locations wherein such data bits are maintained are physical locations that have particular electrical, magnetic, or optical properties corresponding to the data bits.

Figure 9:
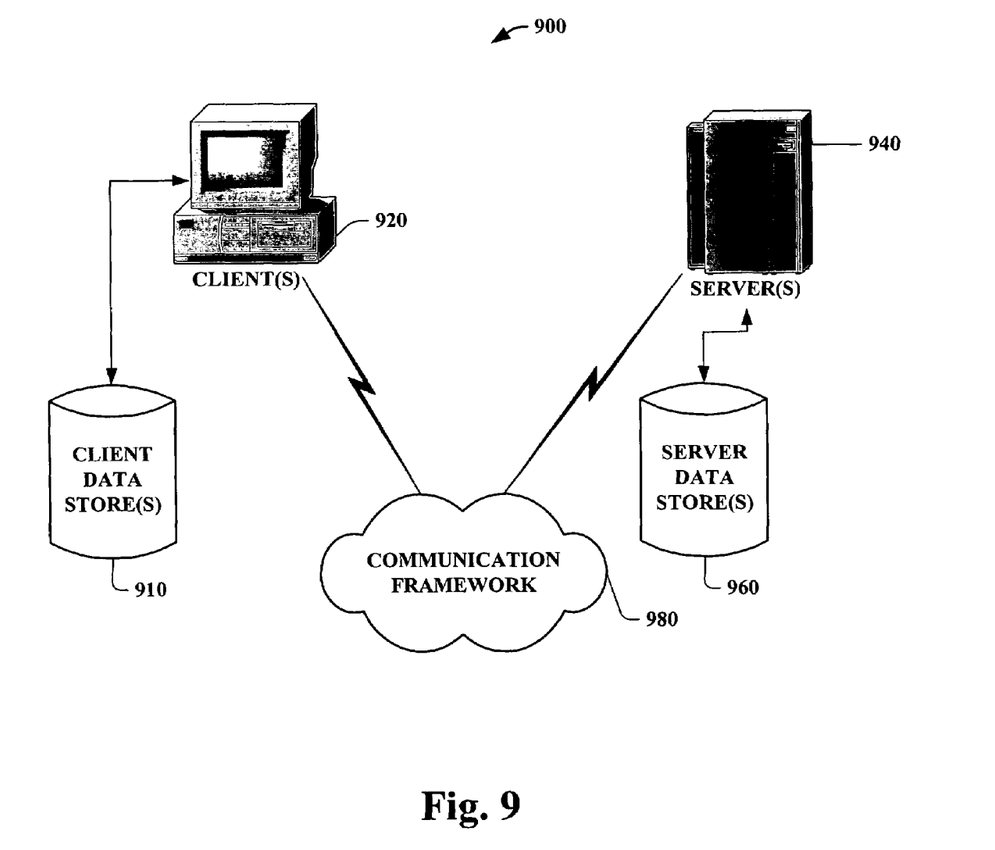
FIG. 9 illustrates a client-server system that can employ a lock release methodology according to one aspect of the present invention.

Referring now to FIG. 9, a client-server system 900 that employs a data manipulation methodology according to one aspect of the present invention is illustrated. The client(s) 920 can be hardware and/or software (e.g. threads, processes, computing devices). The system 900 also includes one or more server(s) 940. The server(s) 940 can also be hardware and/or software (e.g., threads, processes, computing devices). For example, such servers 940 can house threads to perform transformations by employing the present invention. The client 920 and the server 940 can communicate, in the form of data packets transmitted according to the present invention, between two or more computer processes. The client/server can also share the same process. As illustrated, the system 900 includes a communication framework 980 that can facilitate communications between the client(s) 920 and the server(s) 940. The client(s) 920 is operationally connected to one or more client data store(s) 910 that can store information local to the client(s) 920. Moreover, client 920 can access and update databases 960 located on a server computer 940 running a server process. In one aspect of the present invention, the communication frame work 980 can be the internet, with the client process being a Web browser and the server process being a Web server. As such, a typical client 920 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 940 can be university or corporate mainframe computers, or dedicated workstations, and the like.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. Furthermore, to the extent that the terms "includes", "including", "has", "having", and variants thereof are used in either the detailed description or the claims, these terms are intended to be inclusive in a manner similar to the term "comprising."

What is claimed is:

1. A computer system including one or more processors and computer memory, for managing the access of system resources in a database comprising the following computer executable components implemented using the one or more processors and computer memory:
    a lock manager wherein the lock manager:
        acquires a parent lock on a parent resource and one or more child locks on child resource(s) of the parent resource of a database, the locks preventing other applications from at least one of modifying data or using data which may not be accurate;
        stores a reference count of the one or more child locks within the parent lock such that as each child lock is released, the reference count decrements by a value of one, and
        releases the parent lock upon release of all child locks associated therewith, wherein the parent lock is released upon the reference count attainment of a zero value, such that data in the previously locked resources can be at least one of modified or used by another application.

2. The system of claim 1, further comprising a lock monitoring system that monitors the reference count of child locks associated with the parent lock.

3. The system of claim 1 further comprising a lock hierarchy designated by the lock manager.

4. The system of claim 3, the lock hierarchy comprises at least one of a database lock, page lock, table lock and row lock.

5. The system of claim 3 further comprising a page scan optimization that maintains a last child lock until a next one is acquired.

6. The system of claim 3, the one or more child locks is at least one of an exclusive, update and shared lock at a level of the hierarchy.

7. The system of claim 1, the parent lock is an intent lock that protects resources at lower levels.

8. The system of claim 1, the reference count is performed upon completion of at least one of a scan, query or operation.

9. The system of claim 1 further comprising a pointer that can guide a release operation from each child lock to a respective parent lock.

10. A computer implemented method for controlling locks to manage access to system resources in a database the method comprising one or more computer processors performing the following:
    defining a parent-child relation ship among a plurality of locks, on resources in a database, in a lock hierarchy;
    reference counting one or more child locks associated with a parent lock, such that a parent lock maintains a count reference of respective child locks associated therewith and as each child lock is released, the reference count decrements by a value of one, the locks preventing other applications from at least one of modifying data or using data which may not be accurate; and,
    releasing a parent lock upon a release of all the respective child locks associated therewith, wherein the parent lock is released upon the reference count attainment of a zero value, such that data in the previously locked resources can be at least one of modified or used by another application.

11. The method of claim 10 the defining act further comprising arranging a top-down lock granularity based on logical or physical granularities of objects stored in the data base.

12. The method of claim 10 further comprising pointing to a parent lock upon releasing a respective child lock associated therewith.

13. The method of claim 10 further comprising reference counting child locks directly associated with the parent lock.

14. The method of claim 10 further comprising acquiring an intent lock at least in one of a table level, page level and database level.

15. The method of claim 10 further comprising maintaining a reference count within a structure of the parent lock.

16. The method of claim 10 further comprising scoping the reference counting of a lock to a transaction.

17. A computer implemented method for controlling locks to manage access to system resources in a database, the method comprising one or more computer processors performing the following:
    counting one or more child locks on resources in a database associated with a parent lock to obtain a reference count of the child locks associated therewith, the locks preventing other applications from at least one of modifying data or using data which may not be accurate;
    storing a reference count of the one or more child locks within the parent lock such that as each child lock is released, the reference count decrements by a value of one;
    releasing a child lock;
    decrementing the reference count by a value of one; and
    releasing the parent lock upon the reference count reaching a zero value, such that data in the previously locked resources can be at least one of modified or used by another application.

18. The method of claim 17 further comprising monitoring the reference count.

19. The method of claim 17 further comprising identifying the parent lock via a pointer.

20. A computer implemented database lock including one or more processors and computer memory, managing access to system resources comprising:
    a computer executable lock manager, implemented using the one or more processors and computer memory, wherein the computer executable lock manager:
        acquires at least a parent lock and one or more child locks on a database resource, the locks preventing other applications from at least one of modifying data or using data which may not be accurate;
        creates within the parent lock a reference count of the child lock, the reference count is decremented by one on the release of each child lock;
        stores a reference count of the one or more child locks within the parent lock such that as each child lock is released, the reference count decrements by a value of one and
        releases the parent lock upon the reference count attainment of a zero value, such that data in the previously locked resources can be at least one of modified or used by another application.

21. The system of claim 20 further comprising a further computer executable component that monitors the reference count.

22. The system of claim 20 further comprising a forwarding pointer device that identifies a parent lock associated with a released child lock.

23. The system of claim 20 further comprising probabilistic classification models.

24. The system of claim 20, the reference count is the count of direct child locks associated with the parent lock.

\* \* \* \* \*

UNITED STATES PATENT AND TRADEMARK OFFICE
CERTIFICATE OF CORRECTION

| | | |
|---|---|---|
| PATENT NO. | : 7,650,360 B2 | Page 1 of 1 |
| APPLICATION NO. | : 10/826517 | |
| DATED | : January 19, 2010 | |
| INVENTOR(S) | : Steven Bailey et al. | |

It is certified that error appears in the above-identified patent and that said Letters Patent is hereby corrected as shown below:

In column 12, line 15, in Claim 10, delete "relation ship" and insert -- relationship --, therefor.

Signed and Sealed this
Eighth Day of February, 2011

David J. Kappos
*Director of the United States Patent and Trademark Office*